United States Patent
Kim et al.

(10) Patent No.: US 9,036,581 B2
(45) Date of Patent: May 19, 2015

(54) PREDICTIVE EUL SCHEDULING BASED ON SERVICE AWARENESS

(71) Applicant: Telefonaktiebolaget L M Ericsson (publ), Stockholm (SE)

(72) Inventors: Seungtai Kim, Solna (SE); Martin Skarve, Enebyberg (SE); Karl-Johan Lundkvist, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 201 days.

(21) Appl. No.: 13/777,321

(22) Filed: Feb. 26, 2013

(65) Prior Publication Data

US 2013/0250873 A1      Sep. 26, 2013

Related U.S. Application Data

(60) Provisional application No. 61/615,462, filed on Mar. 26, 2012.

(30) Foreign Application Priority Data

Mar. 26, 2012   (EP) .................................... 12161202

(51) Int. Cl.
   *H04W 72/12*   (2009.01)

(52) U.S. Cl.
   CPC ...... *H04W 72/1226* (2013.01); *H04W 72/1242* (2013.01)

(58) Field of Classification Search
   None
   See application file for complete search history.

(56) References Cited

U.S. PATENT DOCUMENTS

| | | | | |
|---|---|---|---|---|
| 5,404,392 A * | 4/1995 | Miller et al. | ................... | 455/466 |
| 5,802,465 A * | 9/1998 | Hamalainen et al. | .......... | 455/403 |
| 5,832,384 A * | 11/1998 | Balachandran et al. | ....... | 455/450 |
| 5,978,368 A * | 11/1999 | Hjelm et al. | ................... | 370/347 |
| 7,177,293 B2 * | 2/2007 | Mansfield | ...................... | 370/335 |
| 7,460,524 B2 * | 12/2008 | Khan | ............................. | 370/353 |
| 8,412,246 B2 * | 4/2013 | Gormley et al. | .............. | 455/509 |
| 8,797,942 B2 * | 8/2014 | Blomgren et al. | ............. | 370/321 |
| 8,817,756 B1 * | 8/2014 | Hart et al. | ...................... | 370/337 |
| 2002/0093930 A1 * | 7/2002 | Dertz et al. | .................... | 370/337 |

(Continued)

FOREIGN PATENT DOCUMENTS

EP         0 521 610 A2      1/1993
WO      WO 99/57924 A1     11/1999

OTHER PUBLICATIONS

Communication with European Search Report, EPO Application No. 12161202.2, Sep. 11, 2012.
Communication pursuant to Article 94(3) EPC, EP Application No. 12161202.2, Sep. 28, 2012.

*Primary Examiner* — Ian N Moore
*Assistant Examiner* — Lakeram Jangbahadur
(74) *Attorney, Agent, or Firm* — Myers Bigel Sibley & Sajovec, P.A.

(57) ABSTRACT

The present invention relates to a method and device for scheduling transmission of data of terminals in a cell. To this end, information is acquired indicating type of communication service for which a first terminal is to be scheduled. Then, the first terminal and at least a second terminal in the cell is scheduled for transmission of data on the basis of the acquired information indicating the type of communication service for which the first terminal is to be scheduled, the at least second terminal being scheduled for data transmission in time periods between data transmissions of the first terminal.

18 Claims, 2 Drawing Sheets

(56) References Cited

U.S. PATENT DOCUMENTS

| | | | |
|---|---|---|---|
| 2005/0122960 A1* | 6/2005 | Khan | 370/352 |
| 2007/0286131 A1* | 12/2007 | Wu et al. | 370/337 |
| 2008/0037502 A1* | 2/2008 | Yokoyama | 370/342 |
| 2008/0159239 A1* | 7/2008 | Odlyzko et al. | 370/337 |
| 2009/0290570 A1* | 11/2009 | Kishiyama et al. | 370/344 |
| 2010/0150087 A1* | 6/2010 | Miki et al. | 370/329 |
| 2011/0075636 A1* | 3/2011 | Blomgren et al. | 370/336 |

* cited by examiner

PREDICTIVE EUL SCHEDULING BASED ON SERVICE AWARENESS

CROSS-REFERENCE TO RELATED APPLICATIONS

The present application claims priority to European Patent Application No. EP12161202.2 and U.S. provisional Patent Application No. 61/615,462, both filed Mar. 26, 2012, the disclosures of both of which are incorporated herein as if set forth fully herein.

TECHNICAL FIELD

The invention relates to a method of, and a device for, scheduling transmission of data of terminals in a cell.

BACKGROUND

The concept of service awareness (SA) provides network elements/nodes with knowledge about the services in use in a network. A number of methods for implementing service awareness in a network exist, for example shallow packet inspection (SPI), deep packet inspection (DPI) or Heuristic Analysis could be used. All three technologies provide different levels of knowledge about traffic and end-user services employed in the network, and typically monitor data of a packet and extracts information from the monitored data on which network decisions can be taken. In this way, the network can for example be made aware of whether a certain network user is using a Facebook application or making a voice over IP (VoIP) call with a mobile phone, etc.

An enhanced uplink (EUL) scheduler in a WCDMA network is responsible for allowing terminals to transmit data according to an approved rate. The terminal may request grants for transmission of data at higher data rates when transmission buffers are filling up in the terminal, and the scheduler grants or denies requested transmission at a higher rate. The network measures terminal activity and when the terminal no longer uses the granted rate, the EUL scheduler is informed thereof, withdraws the grant and releases the granted resources.

In particular, current mechanisms for predicting EUL interference headroom are conservative and based on e.g. measurements of signal-to-interference ratios (SIR) and/or received total wideband power (RTWP) using sliding windows to predict future network load. These are inflexible ways of determining interference headroom and maximal allowed cell interference becomes a trade-off between high levels of terminal transmission power on the one hand and reduction of cell capacity on the other.

SUMMARY

An object of the present invention is to solve, or at least mitigate these problems in the art and provide an improved method and device for effecting scheduling of terminals.

This object is attained in a first aspect of the present invention by a method of scheduling transmission of data of terminals in a cell. The method comprises the step of acquiring information indicating type of communication service for which a first terminal is to be scheduled. Further, the method comprises the step of scheduling the first terminal and at least a second terminal in the cell for transmission of data on the basis of the acquired information indicating the type of communication service for which the first terminal is to be scheduled. By considering the acquired information, the at least second terminal is scheduled for data transmission in time periods between data transmissions of the first terminal.

This object is attained in a second aspect of the present invention by a device for scheduling transmission of data of terminals in a cell. The device comprises a processing unit arranged to acquire information indicating type of communication service for which a first terminal is to be scheduled and schedule the first terminal and at least a second terminal in the cell for transmission of data on the basis of the acquired information indicating the type of communication service for which the first terminal is to be scheduled. By considering the acquired information, the at least second terminal is scheduled for data transmission in time periods between data transmissions of the first terminal.

Thus, by introducing an uplink scheduler for scheduling data transmission of terminals in e.g. a WCDMA cell such that type of communication service which is requested by a terminal is considered by the scheduler, it is possible for the scheduler to take scheduling decisions for terminals included in the cell on the basis of the type of communication service being requested. This information may e.g. be acquired by packet inspection, i.e. the uplink scheduler extracts the required information from the data itself. Alternatively, the information may e.g. be acquired by the scheduler from the terminal itself or from a remote service provider being responsible for providing the service. For instance, for a particular requested communication service, for instance video streaming from the Internet, information regarding specified traffic patterns pertaining to the service can be acquired, and this traffic pattern information can be employed to e.g. schedule a larger number of terminals of a cell. In fact, as will be described in the following, the acquired information can be utilized to effectively "overbook" a cell in terms of capacity while maintaining a given quality of service (QoS).

In an embodiment of the present invention, one or more periods of communication inactivity of the first terminal in the scheduled communication service is determined from the acquired information. Then, a second terminal is scheduled for data transmission during the period(s) of communication inactivity of the first terminal. Advantageously, when determining that for the requested communication service, there are expected periods of silence in communication for the first terminal, the scheduler can take the decision to schedule a second terminal to transmit data during the inactive period of the first terminal. Thus, without effectively assigning more resources, an increase in network throughput may be experienced by having two or more terminals make better use of available network bandwidth. It should be noted that even though the first terminal is inactive in terms of data transmission, some control signalling may still occur during a silent period. For some services, repeated keep-alive signalling is required to prevent a connection from timing out and/or terminating.

In another embodiment of the present invention, the scheduler determines from the acquired information when the period of communication inactivity is to occur. Assuming e.g. that the first terminal is not expected to transmit any data between T1 and T2, the second terminal is scheduled for data transmission during the window delimited by these two points in time. Further, the second terminal is scheduled to use resources for data transmission which initially was assigned to the first terminal. Advantageously, scheduling will become more effective, predictable and flexible. Further advantageous is that resources initially assigned to the first terminal must not be released by the scheduler following a withdrawn transmission grant, but can be temporarily assigned to the second terminal during the period of communication inactivity of the first terminal, which has as a further effect that number of channel switches in the network—as well as amount of signalling traffic—decreases.

In a further embodiment of the present invention, the scheduler assigns the resources from the second terminal to the first terminal when the period of communication inactivity expires. Thus, the resources that initially was assigned to the first terminal for data transmission and which subsequently were temporarily assigned to the second terminal is returned to the first terminal. Advantageously, with this embodiment, the scheduler need not again engage in a scheduling set-up procedure with the first terminal.

In still a further embodiment of the present invention, the scheduler acquires information relating to a communication service for which the second terminal is to be scheduled and considers the acquired information of the second terminal when scheduling the second terminal. For instance, information is acquired indicating the type of communication service for which the second terminal is to be scheduled. To be able to fully make use of the period of communication inactivity of the first terminal, it may be preferred to supply the scheduler with to information regarding the communication service requested by the second terminal. For instance, the assignment of resources may be facilitated if the scheduler is informed of the expected length of data transmission windows of the second terminal such that the data transmissions of the second terminal can be fitted within the periods of communication inactivity of the first terminal. If the fit is unfavourable, a third terminal may be scheduled for data transmission in the period(s) of communication inactivity of the first terminal. It should be noted that any appropriate number of terminals advantageously can be scheduled for data transmission using the method of the present invention.

In yet another embodiment of the present invention, the scheduler determines from the acquired information of the first terminal when the communication service to be scheduled for the first terminal terminates, or when the next period of communication inactivity occurs. Thereafter, the first terminal and/or the second terminal is scheduled to temporarily transmit with an output power resulting in a cell interference level which is higher than the maximal allowed cell interference level, if a time period to either service termination or commence of the period of communication inactivity is below a timing threshold value. Advantageously, in case a time period for data transmission is considered short enough, i.e. if the time period for data transmission up until a next silent period is below a given timing threshold value, one or more of the terminals to be scheduled can be allowed to transmit their data with an output power that results in a cell interference level which at least temporarily is exceeded with respect to a stipulated maximal allowed interference level. Hence, the scheduling utilized in this particular embodiment will make use of the full interference headroom of the cell, where headroom typically is defined as distance from a nominal—e.g. momentary or average—level of interference to an allowed maximal level of interference, above which cell conditions becomes unacceptable from a QoS perspective. By knowing in advance how long a data transmission will last until a next silent period, it will be possible to even overbook the network in terms of the number of terminals which can be scheduled for transmission; if the overbooking is temporary, long-term QoS requirements can still be complied with.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
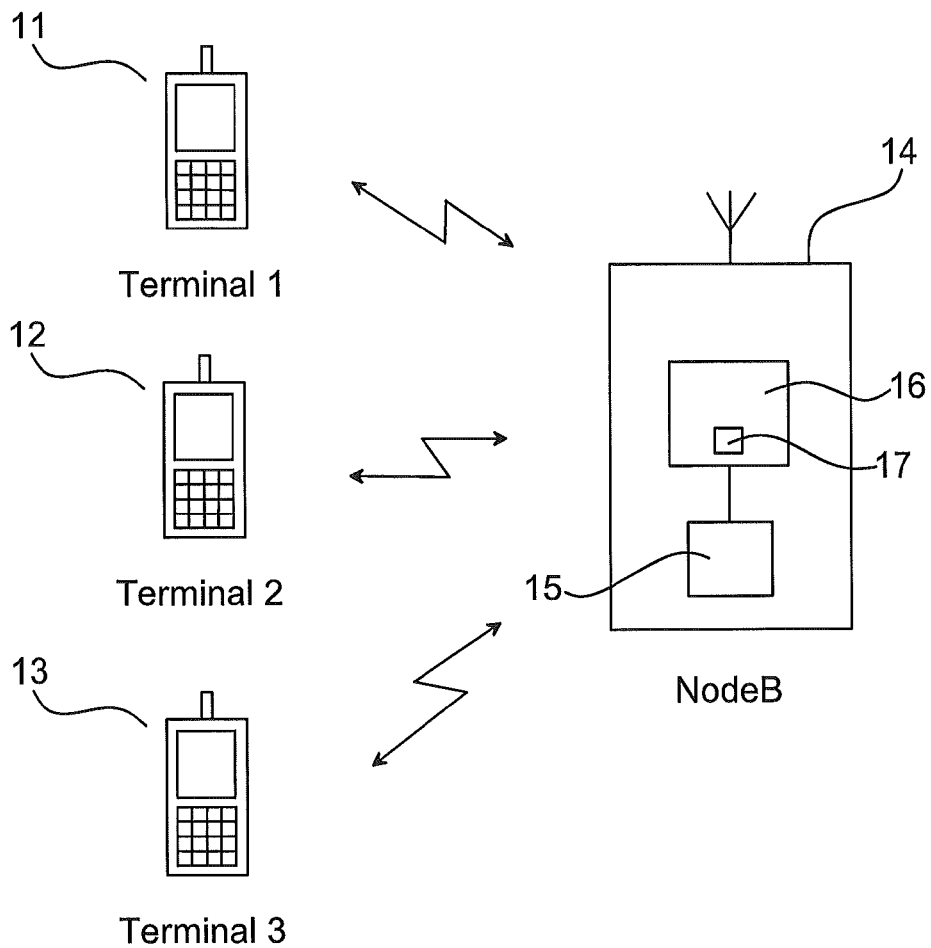
FIG. 1 illustrates a network of terminals communicating with a device according to embodiments of the present invention.

FIG. 1 illustrates a group of terminals 11, 12, 13 communicating with a device 14 being e.g. a radio base station in the form of an eNodeB or a NodeB. The scheduling of data transmission of the terminals according to embodiments of the present invention is managed by an uplink scheduler 15 in the NodeB 14. It should be noted that the uplink scheduler 15 could be implemented in other network components than the eNodeB/Node B 14, such as e.g. in a Radio Network Controller (RNC) in case of a 3G network or in a core network Mobility Management Entity (MME) in case of a Long Term Evolution (LTE) network. This is advantageous in that the scheduling is managed by a central function which has the capability of supervising the terminals 11, 12, 13 and thus take into conditions of all terminals, and ultimately optimize overall network performance. In practice, the uplink scheduler 15 is embodied on the form of one or more microprocessors arranged to execute a computer program 17 downloaded to a suitable storage medium 16 associated with the microprocessor, such as a RAM, a Flash memory or a hard disk. The microprocessor 15 is arranged to at least partly carry out the method according to embodiments of the present invention when the appropriate computer program 17 comprising computer-executable components is downloaded to the memory 16 and executed by the microprocessor 15. The storage medium 16 may be a computer program product comprising the computer program 17. Alternatively, the computer program 17 may be transferred to the storage medium 16 by means of a suitable computer program product, such as a floppy disk, a compact disc or a memory stick. As a further alternative, the computer program 17 may be downloaded to the storage medium 16 over a network. The microprocessor 15 may alternatively be embodied in the form of an application specific integrated circuit (ASIC), a field-programmable gate array (FPGA), a complex programmable logic device (CPLD), etc.

Figure 2:
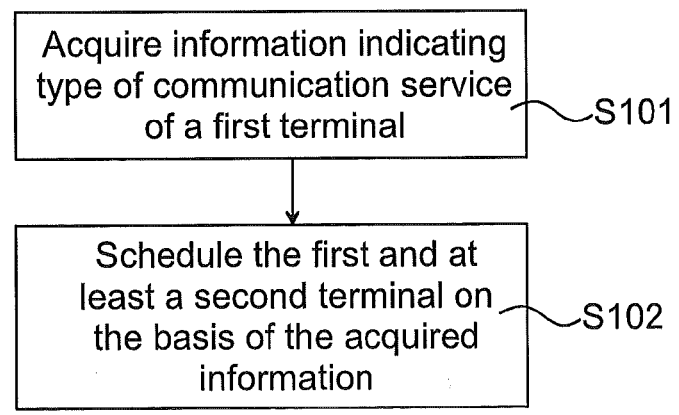
FIG. 2 shows a flowchart illustrating a method of scheduling terminals according to an embodiment of the present invention.

FIG. 2 shows a flowchart illustrating a method of scheduling terminals according to an embodiment of the present invention. When the uplink scheduler 15 located in NodeB 14 is to schedule data transmissions of terminals in a cell, information indicating the type of communication service for which a first terminal 11 is to be scheduled is acquired in step S101. This information can be acquired e.g. using packet inspection. Thus, by extracting certain information from the data packets, the uplink scheduler can determine timing of the data to be transmitted. This information can be extracted at the NodeB 14 or alternatively at an RNC with which the NodeB communicates. The acquired information may contain timing particulars of the data transmission for which the first terminal 11 is to be scheduled, such as when packets in the transmission are to be sent and when periods of inactivity occur between the transmitted packets, data rate information or even information regarding probability that inactivity will occur. Then, in step S102, the uplink scheduler schedules the first terminal 11 and at least a second terminal 12 in the cell for transmission of data on the basis of the acquired information relating to the communication service of the first terminal, such that the second terminal 12 is scheduled for transmission in time periods between data transmissions of the first terminal 11.

Figure 3:
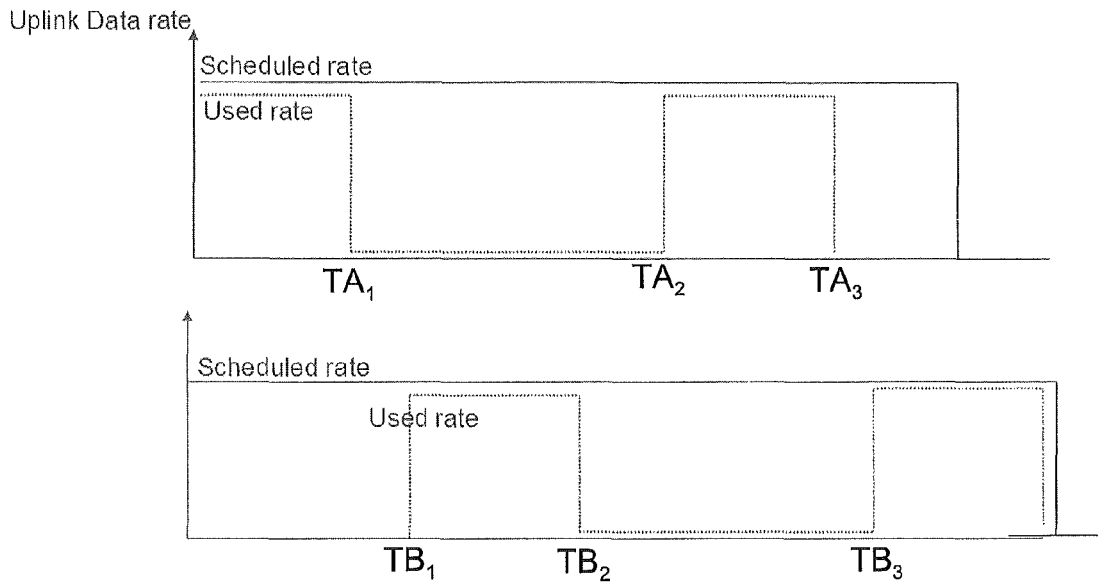
FIG. 3 shows a timing diagram of an example scheduling of two terminals according to an embodiment of the present invention.

FIG. 3 shows a timing diagram of an example scheduling of two terminals 11, 12 according to an embodiment of the present invention. The NodeB 14 extracts information regarding the communication service for which a first terminal 11 is to be scheduled using packet inspection of communication service request data transmitted as packet data by terminal 11. This communication service is referred to as "Application A". By analysing the information, the uplink scheduler 15 knows that a packet will be transmitted at a scheduled rate between time 0 and $TA_1$ and that an interval of terminal inactivity will occur between $TA_1$ and $TA_2$. At $TA_2$, another data packet will be transmitted before Application A terminates at $TA_3$ (or alternatively a further period of inactivity commences). Now, these periods of inactivity of Application A can be utilized for having a second terminal 12 using communication service "Application B" transmit during the periods of inactivity of the first terminal 11. Thus, the second terminal 12 is scheduled for transmission of a data packet in the time period extending between $TB_1$ and $TB_2$. A further data packet can be scheduled for transmission at $TB_3$. Thus, by considering the extracted information, e.g. which particular type of communication service that the first terminal 11 requests, it is possible for the scheduler 15 to take scheduling decisions for terminals included in the cell. In this particular exemplifying embodiment, information regarding specified traffic patterns pertaining to the requested communication service Application A can be acquired, and this traffic pattern information can be employed to schedule the second terminal 12 and its use of Application B. Thus, network capacity is utilized in a more effective manner, since the second terminal 12 is scheduled to transmit data during the periods of inactivity of the first terminal 11. Further, the resources initially assigned to the first terminal 11 must not be released by the scheduler 15 following a withdrawn transmission grant, but can be temporarily assigned to the second terminal 12 during the period of communication inactivity of the first terminal, which has as a further effect that number of channel switches in the network—as well as amount of signalling traffic—decreases.

With further reference to the timing diagram of FIG. 3, it should be noted that the data transmissions indicated by means of a start time and a stop time, for instance the data transmission of the first terminal 11 delimited by $TA_2$ and $TA_3$, in an embodiment of the present invention constitutes a complete data packet burst transmitted by the first terminal 11 comprised of a number of data packets. In another embodiment, the data transmission of the first terminal 11 delimited by $TA_2$ and $TA_3$ is a single data packet. In this context, a silent period e.g. delimited by $TA_1$ and $TA_2$ is not necessarily blank; it may contain some signalling, such as control signalling in the form of for example keep-alive signalling.

Figure 4:
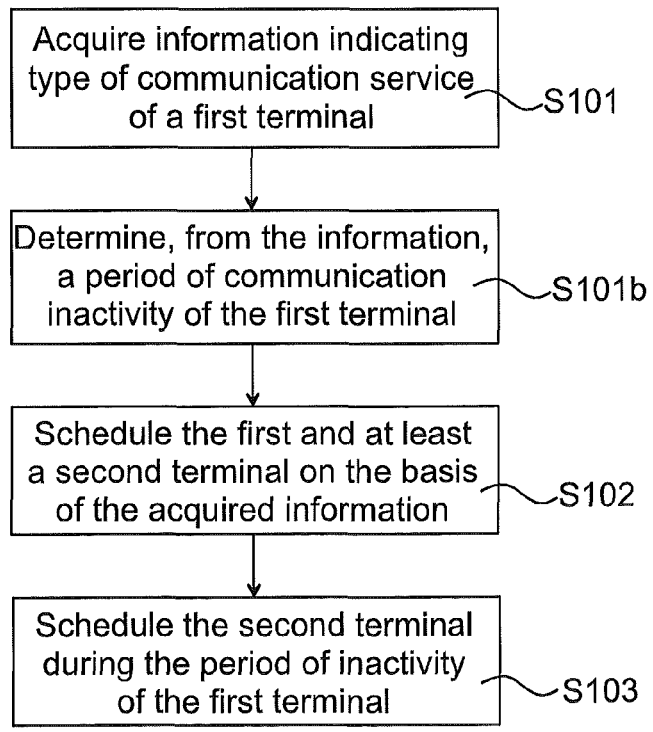
FIG. 4 shows a flowchart illustrating a method of scheduling terminals according to another embodiment of the present invention.

FIG. 4 shows a flowchart illustrating a method of scheduling terminals according to another embodiment of the present invention, the timing diagram of which was shown in FIG. 3. As in the flowchart of FIG. 2, the uplink scheduler 15 acquires information relating to a communication service for which a first terminal 11 is to be scheduled in step S101. However, in this particular embodiment, the scheduler determines in step S101b from the acquired information when a period of communication inactivity is to occur for the first terminal 11 being scheduled for Application A. In this example, the scheduler knows that the first terminal is inactive between instances $TA_1$ and $TA_2$. In step S102, the uplink scheduler schedules the first terminal 11 and at least a second terminal 12 in the cell for transmission of data on the basis of the acquired information relating to the communication service of the first terminal 11, wherein in step S103, the second terminal 12 is scheduled for data transmission during the period of communication inactivity of the first terminal 11, i.e. in the time interval delimited by $TB_1$ and $TB_2$.

Again with reference to FIG. 3, is should be noted that a third terminal 13 could be scheduled for transmission e.g. in the time period delimited by $TB_2$ and $TA_2$. This additionally requires the uplink scheduler 15 to acquire information regarding Application B run by the second terminal 12. An appropriate number of further terminals could be scheduled for transmission during periods of inactivity of the first, second and third terminals 11, 12, 13.

As previously mentioned, in addition to a more effective use of network capacity, the present invention is further advantageous in that the terminals can scheduled to at least temporarily transmit with an output power resulting in a cell interference level which is higher than the maximal allowed cell interference level. Thus, in case a time period for data transmission is considered short enough, i.e. if the time period for data transmission up until a next silent period is below a given timing threshold value, one or more of the terminals to be scheduled can be allowed to transmit their data with an output power that results in a cell interference level which at least temporarily is exceeded with respect to a stipulated maximal allowed interference level. Hence, the scheduling utilized in this particular embodiment will make use of the full interference headroom of the cell. By knowing in advance how long a data transmission will last until a next silent period, it will be possible to even overbook the network in terms of the number of terminals which can be scheduled for transmission; if the overbooking is temporary, long-term QoS requirements can still be complied with.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of scheduling transmission of data of terminals in a cell, the method comprising the steps of:
acquiring information indicating type of communication service for which a first terminal is to be scheduled;
scheduling the first terminal and at least a second terminal in the cell for transmission of data on the basis of the acquired information indicating the type communication service for which the first terminal is to be scheduled, the at least second terminal being scheduled for data transmission in time periods between data transmissions of the first terminal;

determining, from the acquired information, when a period of communication inactivity of the first terminal in the scheduled communication service is to occur; and scheduling the at least a second terminal for data transmission during the period of communication inactivity of the first terminal by using resources assigned to the first terminal for the data transmission of the at least a second terminal.

2. The method of claim 1, wherein the acquired information relating to the communication service specifies timing particulars of the communication service for which the first terminal is to be scheduled.

3. The method of claim 1, further comprising the step of:
assigning the resources from the at least a second terminal to the first terminal when the period of communication inactivity of the first terminal expires.

4. The method of claim 1, further comprising the steps of:
determining from the acquired information of the first terminal when the communication service to be scheduled for the first terminal terminates or when the period of non-activity occurs; and scheduling the first terminal or the at least a second terminal to temporarily transmit with an output power resulting in a cell interference level higher than the maximal allowed cell interference level in response to time to either service termination or commence of period of non-activity being below a timing threshold value.

5. The method of claim 1, further comprising the steps of:
acquiring information relating to a communication service for which the at least a second terminal is to be scheduled; and considering the acquired information of the at least a second terminal when scheduling the at least a second terminal.

6. The method of claim 1, wherein the data is transmitted in packets, and further comprising the step of inspecting the packets to acquire the information relating to the communication service of the first terminal or the at least a second terminal.

7. The method of claim 1, wherein the data is transmitted in packets, and further comprising the step of scheduling the at least a second terminal for transmission of data between transmission of complete data packet bursts of the first terminal.

8. The method of claim 1, wherein the data is transmitted in packets, and further comprising the step of scheduling the at least a second terminal for transmission of data between transmission of data packets comprised in a burst of the first terminal.

9. A device for scheduling transmission of data of terminals in a cell, the device comprising:
a network interface;
an uplink scheduler; and
a processor which:
controls the network interface to acquire information indicating type of communication service for which a first terminal is to be scheduled; and
controls the uplink scheduler to schedule the first terminal and at least a second terminal in the cell for transmission of data on the basis of the acquired information indicating the type of communication service for which the first terminal is to be scheduled, the at least second terminal being scheduled for data transmission in time periods between data transmissions of the first terminal;

wherein the processor is further configured to determine, from the acquired information, when a period of communication inactivity of the first terminal in the scheduled communication service is to occur; and wherein the processor is further configured to control the uplink scheduler to schedule the at least a second terminal for data transmission during the period of communication inactivity determined of the first terminal by using resources assigned to the first terminal for the data transmission of the at least a second terminal.

10. The device of claim 9, wherein:
the processor is further configured to determine from the acquired information of the first terminal when the communication service to be scheduled for the first terminal terminates or when the period of non-activity occurs; and the processor is further configured to control the uplink scheduler to schedule the first terminal or the at least a second terminal to temporarily transmit with an output power resulting in a cell interference level higher than the maximal allowed cell interference level in response to time to either service termination or commence of period of non-activity being below a timing threshold value.

11. A computer program product for scheduling transmission of data of terminals in a cell, the computer program product comprising:
a non-transitory computer readable storage medium storing computer readable program code embodied in the medium, the computer readable program code comprising:
computer readable program code to acquire information indicating type of communication service for which a first terminal is to be scheduled;
computer readable program code to schedule the first terminal and at least a second terminal in the cell for transmission of data on the basis of the acquired information indicating the type communication service for which the first terminal is to be scheduled, the at least second terminal being scheduled for data transmission in time periods between data transmissions of the first terminal;
computer readable program code to determine, from the acquired information, when a period of communication inactivity of the first terminal in the scheduled communication service is to occur; and
computer readable program code to schedule the at least a second terminal for data transmission during the period of communication inactivity of the first terminal by using resources assigned to the first terminal for the data transmission of the at least a second terminal.

12. The computer program product of claim 11, further comprising:
computer readable program code to determine, from the acquired information relating to the communication service, timing particulars of the communication service for which the first terminal is to be scheduled.

13. The computer program product of claim 11, further comprising:
computer readable program code to assign the resources from the at least a second terminal to the first terminal when the period of communication inactivity of the first terminal expires.

14. The computer program product of claim 11, further comprising:

computer readable program code to determine from the acquired information of the first terminal when the communication service to be scheduled for the first terminal terminates or when the period of non-activity occurs; and computer readable program code to schedule the first terminal or the at least a second terminal to temporarily transmit with an output power resulting in a cell interference level higher than the maximal allowed cell interference level in response to time to either service termination or commence of period of non-activity being below a timing threshold value.

15. The computer program product of claim 11, further comprising:

computer readable program code to acquiring information relating to a communication service for which the at least a second terminal is to be scheduled; and computer readable program code to considering the acquired information of the at least a second terminal when scheduling the at least a second terminal.

16. The computer program product of claim 11, wherein the data is transmitted in packets, and further comprising computer readable program code to inspect the packets to acquire the information relating to the communication service of the first terminal or the at least a second terminal.

17. The computer program product of claim 11, wherein the data is transmitted in packets, and further comprising computer readable program code to schedule the at least a second terminal for transmission of data between transmission of complete data packet bursts of the first terminal.

18. The computer program product of claim 11, wherein the data is transmitted in packets, and further comprising computer readable program code to schedule the at least a second terminal for transmission of data between transmission of data packets comprised in a burst of the first terminal.

* * * * *